US011278942B2

(12) United States Patent
Grant et al.

(10) Patent No.: US 11,278,942 B2
(45) Date of Patent: Mar. 22, 2022

(54) METHOD FOR MANIPULATING SMOLDERING COMBUSTION TO REMEDIATE POROUS MEDIA IMPACTED BY RECALCITRANT COMPOUNDS

(71) Applicant: Geosyntec Consultants, Inc., Boca Raton, FL (US)

(72) Inventors: Gavin Grant, Etabicoke (CA); David Major, Guelph (CA); Grant Scholes, Guelph (CA); Jason Gerhard, London (CA)

(73) Assignee: Geosyntec Consultants, Inc., Boca Raton, FL (US)

( * ) Notice: Subject to any disclaimer, the term of this patent is extended or adjusted under 35 U.S.C. 154(b) by 0 days.

(21) Appl. No.: 16/933,257

(22) Filed: Jul. 20, 2020

(65) Prior Publication Data

US 2021/0023594 A1 Jan. 28, 2021

Related U.S. Application Data

(60) Provisional application No. 62/878,136, filed on Jul. 24, 2019.

(51) Int. Cl.
*B09C 1/00* (2006.01)
*B09C 1/06* (2006.01)
*F23G 7/14* (2006.01)

(52) U.S. Cl.
CPC .............. *B09C 1/06* (2013.01); *F23G 7/14* (2013.01); *B09C 1/062* (2013.01); *B09C 2101/00* (2013.01); *F23G 2204/10* (2013.01); *F23G 2204/101* (2013.01); *F23G 2204/103* (2013.01); *F23G 2207/30* (2013.01);

(Continued)

(58) Field of Classification Search
CPC .......... F23G 2204/10; F23G 2204/101; F23G 2204/103; F23G 2207/30; F23G 2209/34; F23G 2900/70; F23G 2900/7011; F23G 7/14; B09C 1/06
See application file for complete search history.

(56) References Cited

U.S. PATENT DOCUMENTS 9,259,770 B2 * 2/2016 Thomas ................ F23C 99/006
2009/0180836 A1 * 7/2009 Gerhard .................... B09C 1/06
405/128.85

(Continued)

FOREIGN PATENT DOCUMENTS

WO 2014093469 A2 6/2014

OTHER PUBLICATIONS

International Searching Authority—International Search Report—International Application No. PCT/US2020/042744, dated Oct. 15, 2020, together with the Written Opinion of the International Searching Authority, 12 pages.

*Primary Examiner* — Janine M Kreck
(74) *Attorney, Agent, or Firm* — Sunstein LLP

(57) ABSTRACT

A method for remediating a contaminated porous matrix including selecting the type and quantity of organic fuel to create a smolderable mixture of the organic fuel and contaminated porous matrix, and controlling the rate of oxidant addition to manipulate the relative proportions of oxidative breakdown products, non-oxidative breakdown products, and non-destructive remediation processes. The method further involves collecting the volatilized contaminant, and any gaseous breakdown products of the contaminant.

25 Claims, 18 Drawing Sheets

(52) U.S. Cl.
CPC ...... *F23G 2209/24* (2013.01); *F23G 2900/70* (2013.01); *F23G 2900/7011* (2013.01)

(56) References Cited

U.S. PATENT DOCUMENTS

| | | |
|---|---|---|
| 2012/0272878 A1 | 11/2012 | Grant et al. |
| 2014/0241806 A1* | 8/2014 | Rockwell .................. B09C 1/06 405/128.6 |
| 2017/0299175 A1* | 10/2017 | Grant ........................ C10J 3/02 |
| 2018/0345338 A1 | 12/2018 | Thomas et al. |

\* cited by examiner

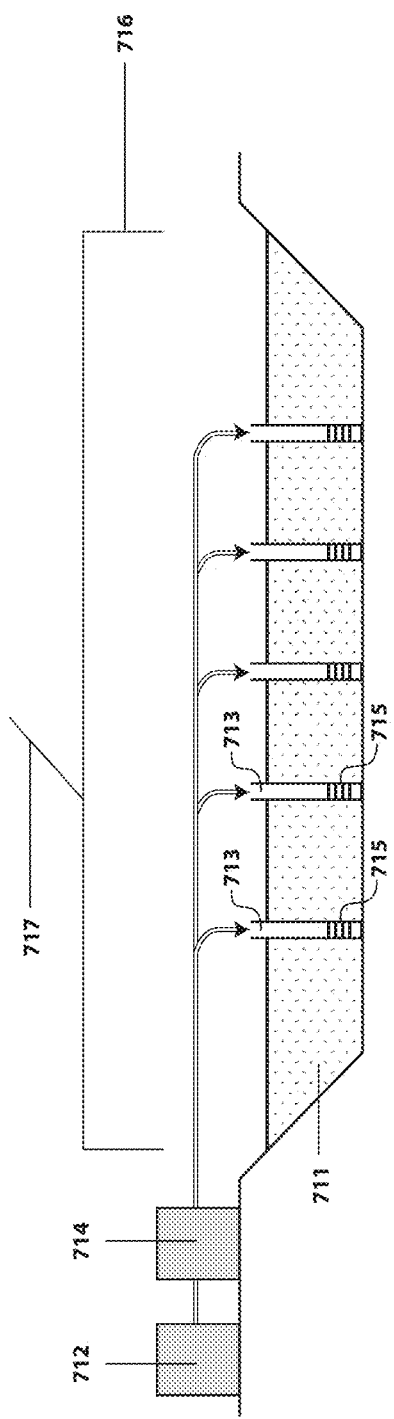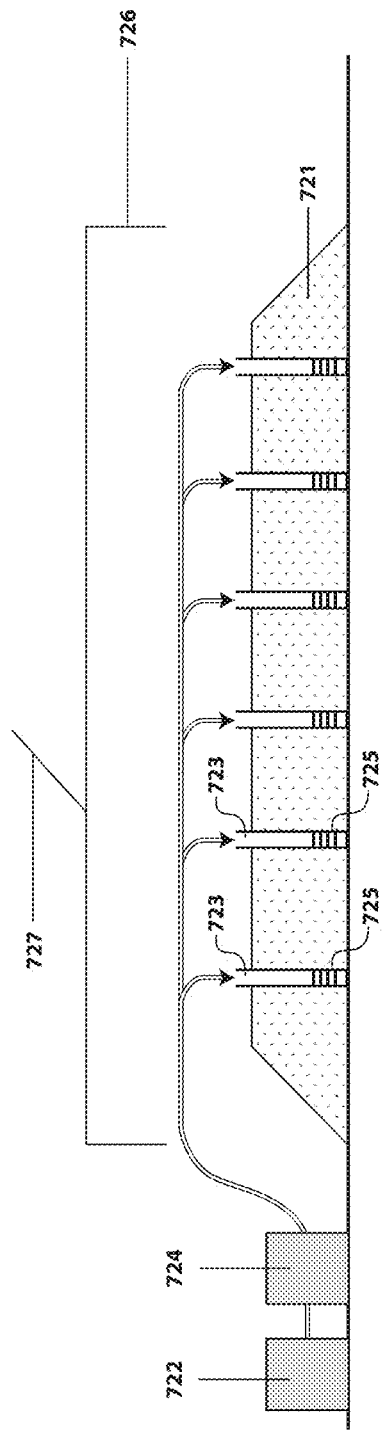

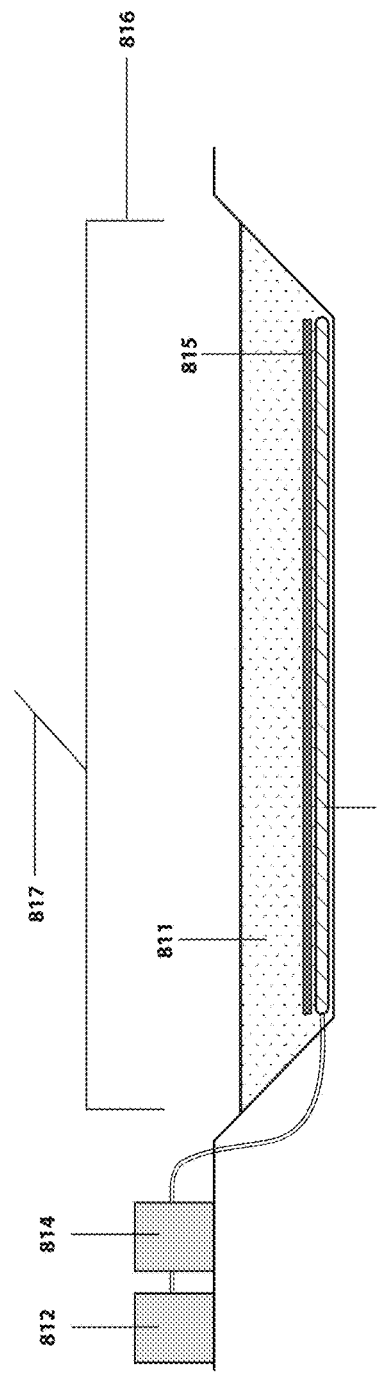
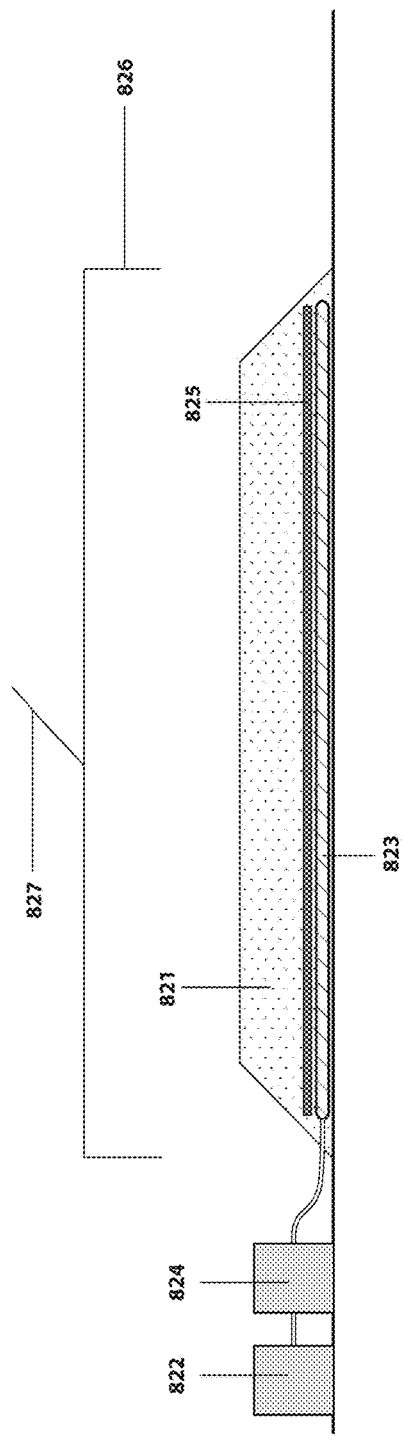

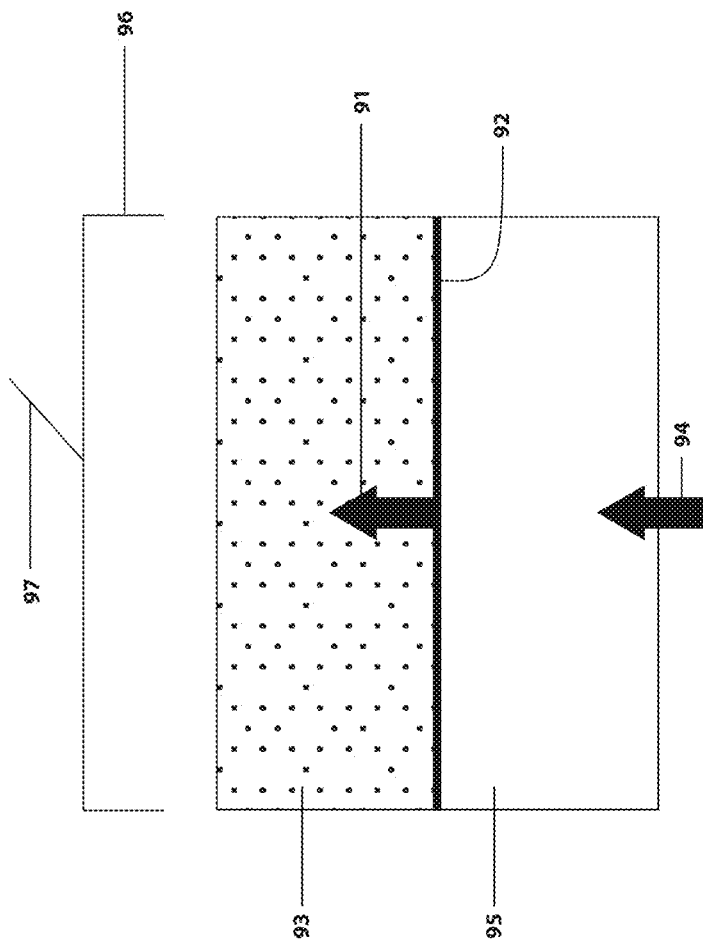

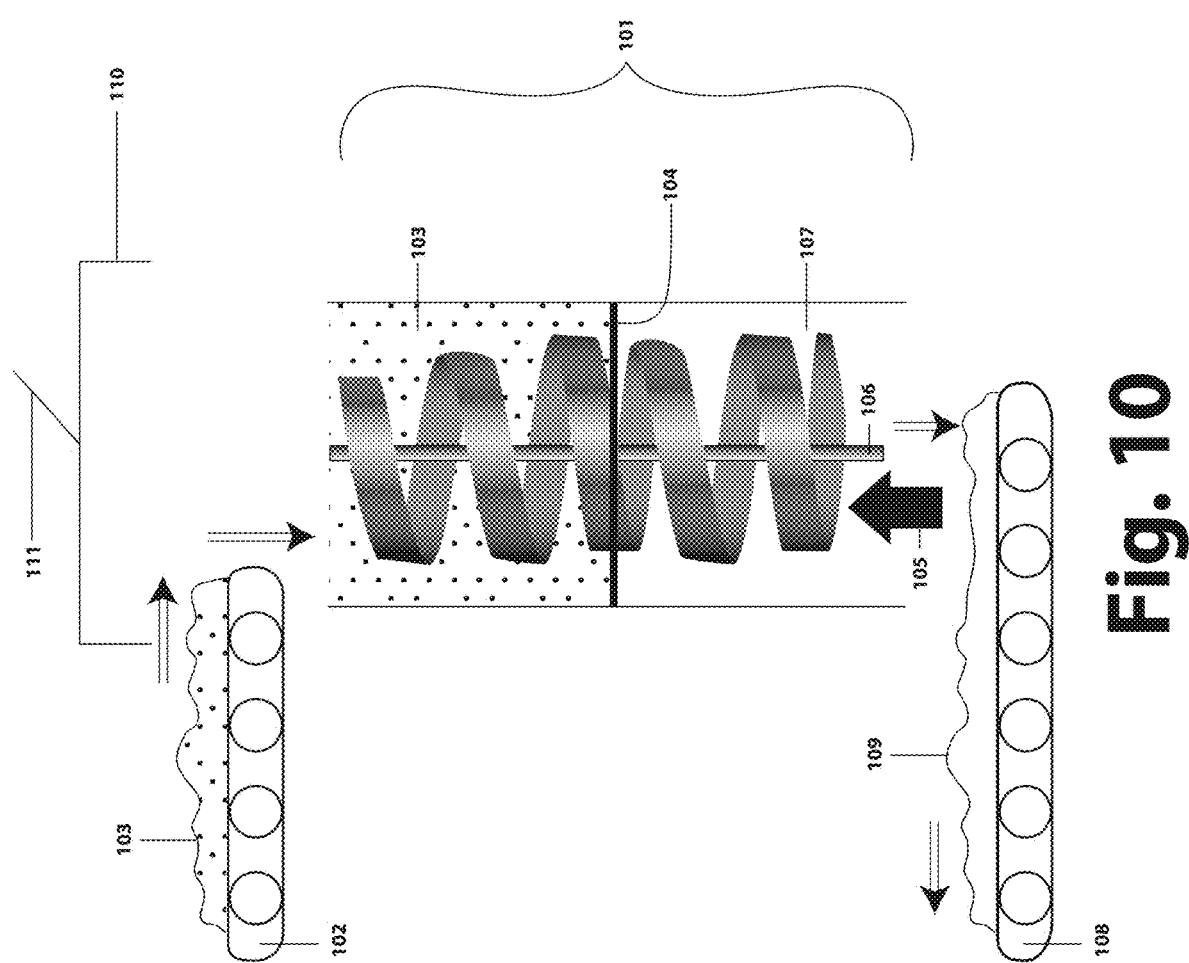

METHOD FOR MANIPULATING SMOLDERING COMBUSTION TO REMEDIATE POROUS MEDIA IMPACTED BY RECALCITRANT COMPOUNDS

The present application claim priority to U.S. Application No. 62/878,136 filed Jul. 24, 2019, which is incorporated herein by reference.

TECHNICAL FIELD

The present invention relates to methods involving smoldering combustion for the remediation of porous media contaminated by recalcitrant compounds. Such methods include approaches for which recalcitrant compounds do not themselves provide the primary fuel in the smoldering combustion reaction.

BACKGROUND ART

Smoldering refers to combustion of a material at the surface of the solid or liquid material itself. For example, when a combustible material (e.g., tobacco) is compacted to form a porous solid (e.g., a cigarette) and is ignited, the oxidant (e.g., oxygen) diffuses into the surface of the material and the combustion proceeds at the surface of the tobacco leaf fragment. Smoldering is referred to as a heterogeneous combustion reaction because the oxidant (gas) and the fuel (liquid or solid) are distinct phases. This is in contrast to flaming combustion which is a homogeneous reaction occurring in a single (gas) phase Smoldering combustion, when applied for the remediation of contaminated soils, is known commercially as the Self-sustaining Treatment for Active Remediation (STAR) technology and is the subject of U.S. Pat. No. 8,132,987.

Smoldering combustion requires a short duration energy input, and the addition of an oxidant (e.g., oxygen, air, etc.), to initiate and sustain the smoldering combustion reaction. Smoldering combustion is only possible in the presence of a fuel source and a porous matrix. A common example of a smoldering combustion reaction is that of a burning charcoal briquette where the charcoal is both the fuel and the porous matrix. For the STAR process, however, the fuel is the organic contaminant and the porous matrix is the volume of soil undergoing remediation.

Smoldering combustion of the organic contaminant may be self-sustaining in that it may only be necessary to supply sufficient energy to ignite the material; once ignited, combustion of the material may proceed as long as there is sufficient fuel (the combustible material) and oxygen for combustion to take place. This is in contrast with, for example, known thermal remediation processes such as thermal desorption, which require continuous energy input.

If sufficient fuel is not present (i.e., the contaminant concentration or saturation in soil is too low to support a self-sustaining combustion reaction), an organic fuel may be added to the porous matrix material to facilitate the smoldering combustion process and the remediation of the contaminated porous matrix material.

There are a variety of organic and inorganic contaminants that are resistant to remediation by chemical, biological, or other means. Examples of recalcitrant compounds include per- and polyfluoroalkyl substances (PFAS), dioxins, and PCBs, metals, and other inorganic compounds. These types of recalcitrant compounds, however, may be amenable to oxidative destruction via smoldering combustion.

U.S. patent application Ser. No. 15/608,797 speaks to the use of smoldering combustion to destroy these recalcitrant compounds through oxidative destruction (i.e. combustion) within contaminated soil by first adding a solid or liquid fuel comprising organic material to act as the primary fuel for combustion. Solid fuels appropriate for these applications include wax, wood chips, sawdust, tire scraps, waste rubber compounds, coal, granular activated carbon, solid fat, and combinations thereof. It is also known that liquid fuels can also be used for this purpose such as vegetable oil, crude oil, waste oils and sludges, tar, polymers, and combinations thereof. Solid and liquid fuels can also be used together to carry out this process.

Oxidative destruction of PFAS and other recalcitrant compounds via smoldering combustion is possible if the temperature of the combustion reaction is sufficiently high. In smoldering combustion, temperature is a function of the complex interplay between the various components of the system, including fuel type, fuel quantity, the rate of oxidation, the rate of oxidant addition, the presence and characteristics of heat sinks, and other factors. The temperatures required for the oxidative destruction of recalcitrant compounds are achievable via smoldering combustion primarily via the selection of an appropriate, high combustion-temperature fuel that is added to the contaminated soil. For example, when granular activated carbon (GAC) is used as the primarily combustion fuel, <5% by weight in soil can achieve the temperatures required for the oxidative destruction of PFAS (believed to be >900° C.).

In U.S. patent application Ser. No. 15/608,797 referenced above, the goal is the in-soil oxidative destruction of the contaminant. However, remediation of contaminant soils does not require the oxidative destruction of these contaminants. Non-destructive removal or separation processes such as thermal desorption can also render the soils free from contamination.

Thermal desorption is an environmental remediation technology that utilizes heat to remove (separate) the contaminants from soil via volatilization. The volatilized contaminants are typically collected for subsequent destruction or disposal. Thermal desorption can be applied for the remediation of soils impacted by recalcitrant compounds. For example, recent studies have demonstrated that temperatures of 350° C. (well below the temperature required for thermal degradation) can result in approximately 99.4 percent removal of total PFAS (29 PFAS compounds analyzed) within two days (https://www.jacobs.com/news/236/jacobs-studyl-demonstrates-effective-removal-of-per-and-polyfluoroalkyl-substances-from-soil).

SUMMARY OF THE EMBODIMENTS

Thermal desorption is typically carried out by installing gas-fired or electric heaters within the soils and energizing these heaters until the entire volume of soil is conductively heated to the desired treatment temperature. This is generally considered an energy intensive and costly process. However, according to a first aspect of the invention described herein, smoldering combustion can also drive the thermal desorption process for recalcitrant compounds if the temperature of the smoldering combustion reaction is below the temperature where oxidative destruction occurs, providing a low-energy alternative to gas-fired or electrically powered soil heating.

According to a second aspect of the invention described herein, under some conditions, smoldering combustion can also result in thermal degradation (non-oxidative destruction) of recalcitrant compounds. Finally, a third aspect of the described invention is that, under some conditions, oxidative destruction (i.e. combustion), thermal degradation, and thermal desorption (i.e., volatilization) will all take place, and the balance among these processes is a function of temperature and the operating parameters of the smoldering combustion system.

For example, when considering the remediation of the soil contaminated with PFAS compounds, a smoldering combustion reaction that favors in-soil oxidative destruction might involve the addition of granular activated carbon at a high concentration (e.g., 5 to 10% by weight) and a low injected air flow rate to maximize temperatures and minimize the removal of volatilized compounds. However, if the goal is to promote PFAS removal (not destruction), then granular activated carbon should be added at a lower concentration (e.g., 1-3% by weight) with a high injected air flow rate. Thermal degradation (i.e. non-oxidative destruction) is favored at temperatures/flow rates in between these end cases. The proportion of oxidative destruction versus thermal degradation versus non-destructive removal (i.e., volatilization) of contaminants can be manipulated through the selection of the solid or liquid fuel in terms of type and quantity, the inclusion of a heat sink and control of the rate of oxidant addition to the system, and combinations thereof.

In accordance with one embodiment of the invention, a method for remediating contaminated soil includes selecting a solid and/or liquid organic fuel, creating a smolderable mixture of the contaminated soil and organic fuel, heating a portion of the smolderable mixture, and forcing oxidant through the smolderable mixture to initiate a self-sustaining smoldering combustion of the smolderable mixture. Following initiation, the source of heat applied to the smolderable mixture is removed, and the self-sustaining smoldering combustion propagates through the smolderable mixture.

According to one embodiment, the method further involves controlling the rate of oxidant addition to the smolderable mixture, so that at least a collectable portion of a contaminant is volatilized, and collecting the volatilized contaminant.

According to another embodiment the method involves controlling the rate of oxidant addition to the smolderable mixture so that a portion of the contaminant is broken down into at least one collectable portion of a gaseous breakdown product, and so that at least a collectible portion of the contaminant is volatilized, and collecting the volatilized contaminant and the gaseous breakdown product of the contaminant. In some embodiments the relative proportions of breakdown product due to oxidative destruction, breakdown product due to thermal degradation, and volatilized contaminant are controlled by controlling the rate of oxidant addition to the smolderable mixture.

In some embodiments, the relative proportion of oxidative destruction versus thermal degradation versus vaporization can be further controlled through the selection of the organic fuel in terms of type and quantity, and/or the inclusion of a heat sink.

The method may propagate the combustion away from the point of ignition of the combustion. The organic fuel may be wax, wood chips, sawdust, tire scraps, waste rubber compounds, coal, granular activated carbon, solid fat, vegetable oil, crude oil, waste oils and sludges, tar, polymers, and other organic materials that by themselves form a porous matrix or can be mixed with a porous material, and combinations thereof. The organic fuel may be a liquid, a slurry, or a solid.

In some embodiments, the contaminated porous matrix may be mixed with the organic fuel to create a smolderable mixture. The smolderable mixture may be combusted in place (in situ) or combusted above the ground.

Oxidant may be forced through the smolderable mixture by injecting air into the smolderable mixture through one or more injection ports and/or by creating a vacuum to suck oxidant through the smolderable mixture. The oxidant may be forced through the smolderable mixture at a linear velocity of between 0.0001 and 100 centimeters per second.

Self-sustaining smoldering combustion may be achieved by applying heat to the smolderable mixture from at least one internal conductive heating source in direct contact with the smolderable mixture, or at least one convective heating source coupled to the smolderable mixture. The convective heating source coupled to the smolderable mixture may be external to the mixture or located within the smolderable mixture. A self-sustaining smoldering combustion may be also be achieved by applying radiative heat to the smolderable mixture. Smoldering combustion may be performed at a temperature within a range between 200 and 2000 degrees Celsius.

In an embodiment of the invention there is provided a method for emplacing the organic fuel in a manner that forms a smolderable mixture below ground that can trap (e.g., absorbs) dissolved contaminants and/or that can encapsulate the volume of soil that contains contaminants.

In other embodiments, the volume of soil containing the contaminants is mixed with organic fuel and other treatment materials to create a smolderable mixture.

In other embodiments, the smolderable mixture absorbs and concentrates the contaminants allowing their removal from water and thereafter their destruction or removal by smoldering.

In other embodiments, the absorption and concentration of the contaminants facilitates the smoldering combustion process of the smoldering mixture.

In other embodiments, the combustion of the smolderable mixture creates temperatures that combust, thermally degrade, and/or remove by volatilization contaminants within the smolderable mixture.

In other embodiments, after combustion, additional organic treatment material can be added to the volume of soil containing the contaminants for additional treatment.

In other embodiments, the smolderable mixture can be combusted in place (i.e., in situ).

In other embodiments, the smolderable mixture can be removed and smoldered above ground (i.e., ex situ).

In other embodiments, the smolderable mixture can be created and smoldered above ground (i.e., ex situ).

In general terms, in each of the above described embodiments, it is desired to create a smolderable mixture through the addition of an organic fuel to a contaminated porous matrix and promote/maintain self-sustained smoldering combustion of the smolderable mixture as a method to oxidatively destroy, thermally degrade, and/or thermally desorb the contaminant(s) in/from porous matrix, where the proportion of oxidative destructive versus non-oxidative destructive vs. non-destructive remediation processes is controlled by the selection of the solid or liquid fuel in terms of type and quantity, the inclusion of a heat sink and/or through manipulation of the rate of oxidant addition to the system.

BRIEF DESCRIPTION OF THE DRAWINGS

The foregoing features of embodiments will be more readily understood by reference to the following detailed description, taken with reference to the accompanying drawings, in which:

FIG. 7A is a cross-sectional schematic of a depression comprising an smolderable mixture of organic fuel and contaminated porous matrix material with a plurality of air supply ports and heating elements.

FIG. 7B is a cross-sectional schematic of a soil pile comprising an smolderable mixture of organic fuel and contaminated porous matrix material with a plurality of air supply ports and heating elements.

FIG. 8A is a cross-sectional schematic of a depression comprising an smolderable mixture of organic fuel and contaminated porous matrix material, oxidant source, air supply port within the depression, and alternative heating elements.

FIG. 8B is a cross-sectional schematic of a soil pile comprising an smolderable mixture of organic fuel and contaminated porous matrix material, oxidant source, air supply ports within the pile, and alternative heating elements.

FIG. 9 is an illustration of a combustion front progressing through the smolderable mixture of organic fuel and contaminated porous matrix material along the direction of air flow.

FIG. 10 is cross-sectional view of a reaction vessel where a conveyor or auger device is used to convey a continuous or semi-continuous supply of an admixture of organic fuel and contaminated porous matrix material to a smoldering combustion reaction front.

DETAILED DESCRIPTION OF SPECIFIC EMBODIMENTS

Figure 1:
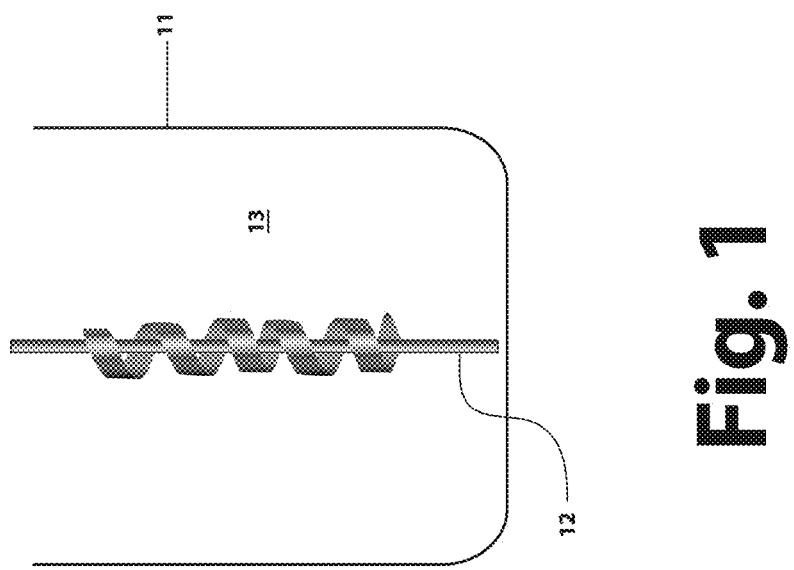
FIG. 1 is a schematic cross-sectional view of a mixing vessel of embodiments of the invention and an exemplary mixing tool.

Embodiments described herein rely on the principles of self-sustained smoldering combustion for the remediation of soil. These embodiments provide benefits over currently available soil remediation techniques for contaminants that are considered recalcitrant. Specifically, a smolderable mixture is formed by mixing an organic fuel (e.g., activated carbon, charcoal, vegetable oil, polymers, surfactants alone or in combination), that in itself may or may not be porous, with a porous matrix (e.g., soil, sand) that is contaminated (either dissolved in groundwater, sorbed to soil, or present as a separate phase). The contaminated smolderable mixture is combusted via self-sustaining smoldering combustion, and is thereby remediated through a combination of destructive (combustion and thermal degradation), and non-destructive (thermal desorption) processes, the relative proportions of which are controlled by the selection of the organic fuel in terms of type and quantity, the inclusion of a heat sink and/or through manipulation of the rate of oxidant addition to the system.

Embodiments of the present invention are based on using smoldering combustion to oxidatively destroy, thermally degrade or remove dissolved, sorbed, or separate phase contaminants either above or below ground.

The smoldering combustion process results in the generation of energy, water, and vaporous emissions, primarily carbon dioxide, carbon monoxide, and to a lesser extent volatile organic compounds and other compounds depending on the composition of the contaminants and solid material(s).

In embodiments of the present invention, the smolderable mixture serves as a scaffold to both entrap the contaminants that are to be treated and an environment that facilitates smoldering combustion. Smoldering combustion is maintained through the efficient recycling of energy within the system. First, the organic fuel within the smolderable mixture, which may include organic contaminants that are concentrated in the smolderable mixture, are combusted, giving off heat energy which is retained by the porous matrix. Second, the retained heat energy is returned to the system from the porous matrix to pre-heat any other organic material within the smolderable mixture farther removed from the point in space where the combustion process was initiated. Thus, following a short duration energy input to initiate the process, smoldering combustion is self-sustaining (i.e., it uses the energy of the combusting organic materials—contaminants and/or organic fuels—along with a supply of oxidant, to maintain and control the reaction) and is capable of propagating away from the point of ignition through the smolderable mixture. Smoldering is the only type of combustion reaction that can propagate through an organic fuel/porous matrix mixture (i.e., flames are not capable of propagating through such a system). In a self-sustaining process, the heating source is terminated following the initiation of smoldering combustion.

The self-sustaining smoldering combustion process will also generate sufficient temperatures to oxidatively destroy, thermally degrade, and/or remove by vaporization organic contaminants that are within the smolderable mixture if the following conditions are met: (1) the organic material (contaminants and/or organic fuel) contains sufficient inherent energy to sustain a smoldering combustion process (i.e., it is a combustible material); (2) the organic material is a porous matrix itself or is mixed with a porous matrix to enable the smoldering process; (3) a heat source is provided to initiate the process; and (4) at least one oxidant (e.g., oxygen, air) initiates and maintains the process.

The degree of oxidative destruction, thermal degradation and vaporization are controlled by the selection of the solid or liquid fuel in terms of type and quantity, the inclusion of a heat sink and/or through manipulation of the rate of oxidant addition to the system.

The self-sustaining smoldering combustion treatment method applies to either solid or liquid organic materials and can be conducted in synthetic or natural porous medium or granular solid matrices.

Definitions. As used in this description and the accompanying claims, the following terms shall have the meanings indicated, unless the context otherwise requires.

The term "porous matrix" refers to a synthetic or natural solid material having pores (open spaces) and wherein the solid material may be a single piece having pores or a collection of granular solids having pores there between. Examples of materials suitable of comprising the porous matrices of embodiments of the present invention include sand, gravel, glass beads, wood chips, zeolite, activated carbon, charcoal, soil, crushed stone, ceramic chips or beads, and combinations thereof. The porous matrix may be organic and therefore combustible or inorganic and not combustible.

The term "contaminated porous matrix" refers to a porous matrix that includes a contaminant material to be destroyed to form one or more gaseous breakdown products or thermally desorbed by means of a smoldering combustion process. Following the smoldering combustion process, the gaseous breakdown products and/or the volatilized contaminant are captured for further processing. In some embodiments, the contaminant may provide one or both of the porous matrix and the smolderable material.

The term "smoldering combustion" refers to the act or process of burning without flame; a rapid oxidation accompanied by heat and light but not flame. In smoldering combustion, the combustion occurs on the surface of the fuel (i.e., not in the gas phase above the fuel as with a flame). For the examples considered here, fuel is provided by organic material.

The term "organic fuel" refers to either a liquid or a solid containing combustible carbon compounds. In some embodiments, the organic fuel may be or may include combustible compounds that can be used as a fuel source for smoldering combustion to destroy or volatize a contaminant. In some embodiments, the contaminant itself may provide a fuel source for smoldering combustion. In some embodiments the organic fuel may also provide the porous matrix.

The term "carbon compound" in the context of this disclosure refers to any carbon-containing species, including hydrocarbons, activated carbon and charcoal.

"Self-sustaining" refers to reaction conditions wherein smoldering combustion propagates through the organic material without the application of external energy; that is, when the already smoldering organic material produces sufficient heat to elevate the temperature in the adjacent material to its combustion point. Conditions may be self-sustaining even if initially the application of heat is required to initiate smoldering combustion.

The term "smolderable mixture" refers to any mixture of porous matrix, organic fuel, or conglomeration or aggregation of a porous matrix material that supports smoldering combustion.

The term "ignition" refers to the process of initiating smoldering combustion.

The term "conductive heating" refers to the transfer of thermal energy by direct physical contact.

The term "convective heating" refers to the transfer of thermal energy by the movement of fluids.

The term "radiative heating" refers to the transfer of thermal energy by electromagnetic radiation.

The term "break-down product" refers to a product formed by reaction of a contaminant with oxygen ("oxidative breakdown product", notably $CO_2$) or to a product formed as the contaminant is broken down into gaseous species by processes not involving oxidation ("non-oxidative breakdown product").

The term "oxidative destruction" when applied to a contaminant refers to the reaction of the contaminant with oxygen (i.e. the combustion) to break down the contaminant into breakdown products.

The term "thermal degradation" when applied to a contaminant refers to the breakdown of the contaminant into breakdown products by non-oxidative processes. The terms thermal degradation and non-oxidative destruction are, when applied to a contaminant, regarded as synonymous.

The term "thermal desorption" in reference to a contaminant refers to vaporization of the contaminant involving only a phase change, and not a chemical reaction. In particular, if a contaminant is vaporized, it is neither oxidatively nor non-oxidatively destroyed.

The term "organic contaminant" refers to carbon compounds that can be broken down into break-down products by oxidative destruction, non-oxidative destruction, or some combination thereof.

The "porous matrix" may be the "organic fuel".

The "smolderable mixture emplacement" may be achieved in situ via manual methods involving the use of a backhoe or excavator, jetting, fracking, trenching, soil mixing or other methods.

Many organic fuels may be used as the fuel source for smoldering combustion by the methods disclosed herein. Examples of organic fuels for which the methods are particularly effective include hydrocarbon mixtures such as coal, activated carbon in all forms, shredded tires, wood, char and vegetable oils.

In embodiments of the invention, the following porous matrix materials have been found to form suitable smolderable mixtures with organic fuels: silt, sand, gravel, ceramic beads, porous metals, porous ceramics, coal, charcoal, activated carbon, and glass beads. These materials, if sized correctly, have a high surface area to volume ratio such that a sufficient amount of heat generated during the combustion process is transferred to and stored in the matrix material, so as to make the heat stored in the matrix material available to assist in further combustion of the organic fuel. The matrix material has further characteristics of sufficient pore space to receive organic fuel admixed therewith, and surface, shape, and sorting characteristics that are amenable to air flow through the pore spaces.

Ignition of smoldering combustion requires both a heating source to initiate combustion and a source of oxidant to initiate and maintain combustion.

FIG. 1 illustrates a mixing vessel (11), according to certain embodiments of the invention, into which an organic fuel and a contaminated porous matrix, are added. A mixing tool (12) is used to create an smolderable mixture of organic fuel and contaminated porous matrix materials (13). In particular embodiments of the invention, mixing may occur within the reaction vessel or impoundment in which smoldering combustion is to be initiated. In the particular embodiment of FIG. 1, a helical mixing tool (12) is depicted, although any shape may be used, including corkscrew and paddle-shaped mixing tools.

A mixing vessel (11) may be a manufactured cylindrical column or rectangular box (e.g. stainless steel, double walled vessel) or bin, an excavated hole, designated pile, or walled-in enclosure in which a contaminated porous matrix is emplaced and mixed with an organic fuel in preparation for application of the smoldering process.

The contaminated porous matrix may naturally contain sufficient combustible organic material to sustain smoldering combustion, or, alternatively, organic fuel can be added in order to sustain smoldering combustion.

Emplacement of the contaminated porous matrix may be achieved manually, via backhoe or excavator, or automatically via screw conveyor or conveyor belt systems. Liquid emplacement may be achieved via pouring, pumping, conveyor, or gravity feed (e.g., siphoned).

Many organic fuels may be used as the fuel source for the smoldering combustion process by the methods disclosed herein. Examples of organic materials for which the methods are particularly effective include hydrocarbon mixtures such as coal, coal tar and creosote, charcoal, tar, shredded tires, agricultural waste, petroleum hydrocarbons, and waste sludges. Methods described here are particularly well suited to solid or liquid organic materials such as vegetable oil, woodchips, and granular activated carbon (GAC).

Figure 2:
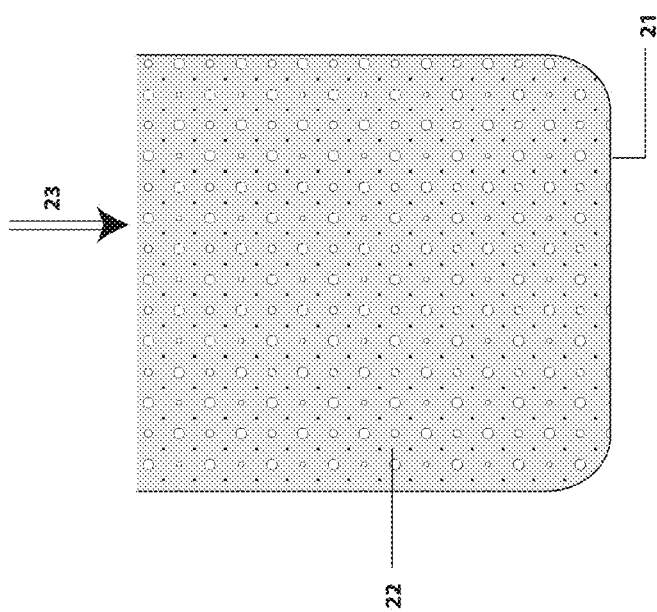
FIG. 2 is a schematic cross-sectional view of a mixing vessel containing a contaminated porous matrix.

FIG. 2 depicts another embodiment of the invention in which a mixing or reaction vessel (21) contains a contaminated porous matrix material (22) into which an organic fuel is added (23) to create a smolderable mixture of organic fuel and contaminated porous matrix material. In particular embodiments where a liquid or semi-liquid organic fuel is combusted, a smolderable mixture is created as the organic fuel percolates between the matrix particles. Mixing may be assisted by using a mixing tool as described herein. It is also possible to add solid organic fuel to a porous matrix in a mixing or reaction vessel and subsequently create an admixture by using a mixing tool.

The mixing tool may be a mechanical mixer (12) such as an auger or a screw or other rotating devices. Mixing may also be achieved via vibration, or rotation (flipping) of the entire vessel. The mixing may also be achieved passively by adding the liquid to the porous matrix within the vessel and allowing it to disperse naturally due to gravity or capillarity or by injecting under pressure into the bottom of the vessel, filling the pore space of the matrix as it migrates to the top of the vessel. The organic fuel may be added to the porous matrix as a flow or stream of fluids through a pipe, chute, or other emitter.

The mixing process may take place within the same vessel used for the smoldering process in a continuous, batch or semi-continuous process, or completed in a separate dedicated mixing vessel, or without any vessel (i.e., in a pile).

Addition of the contaminated porous matrix (23) may be achieved manually, via backhoe or excavator, or automatically via screw conveyor or conveyor belt systems.

The conveyor system may be a screw or belt conveyor system leading from a mixing vessel to the reaction vessel and from the reaction vessel to a matrix pile. The admixture conveyor may be a screw conveyor or other mechanical conveying device or be a release mechanism to allow the gravity-fed passage of treated material through the reaction vessel.

Figure 3:
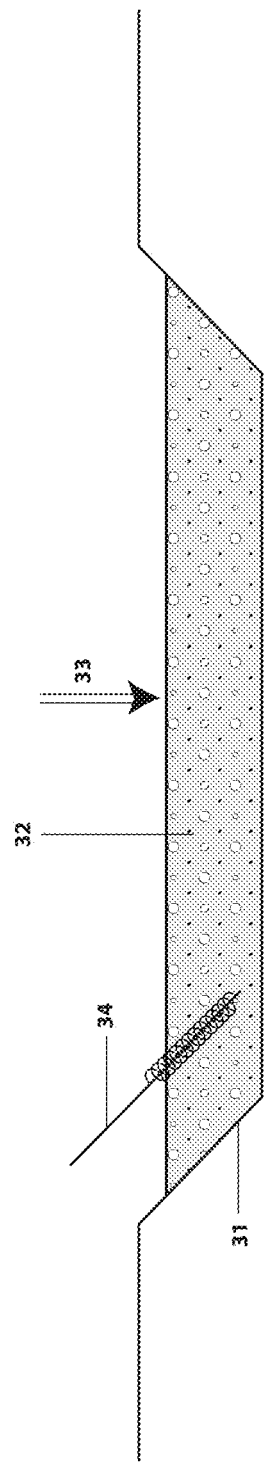
FIG. 3 is a schematic cross-sectional view of a depression containing a contaminated porous matrix material that has been mixed with a volume of solid, semi-solid, and/or liquid organic fuel.

Embodiments of the invention include impoundment of organic fuel with a contaminated porous matrix in an above-ground vessel. However, it is also possible for the impoundment to be below ground (i.e., below the surface of the earth) in a depression. FIG. 3 illustrates an embodiment wherein the impoundment is in a depression (31). The depression includes a volume of solid, semi-solid, or liquid organic fuel (32) agglomerated with a contaminated porous matrix material (33) and admixed with a mixing tool (34) to create an admixture of organic fuel and contaminated porous matrix material. An example of such a depression (31) may be a lined or unlined excavation, converted pool, or natural depression (32). It should be appreciated that the order of addition of the contaminated porous matrix and the organic fuel is not particularly important. Embodiments are possible where the depression is first filled with contaminated porous matrix and the organic fuel is added thereafter, or where the depression is first filled with organic fuel and then the contaminated porous matrix is added. Either way, an admixture is formed in a below-ground space of suitable proportions to permit smoldering combustion and treatment of contaminated porous matrix materials.

Figure 4:
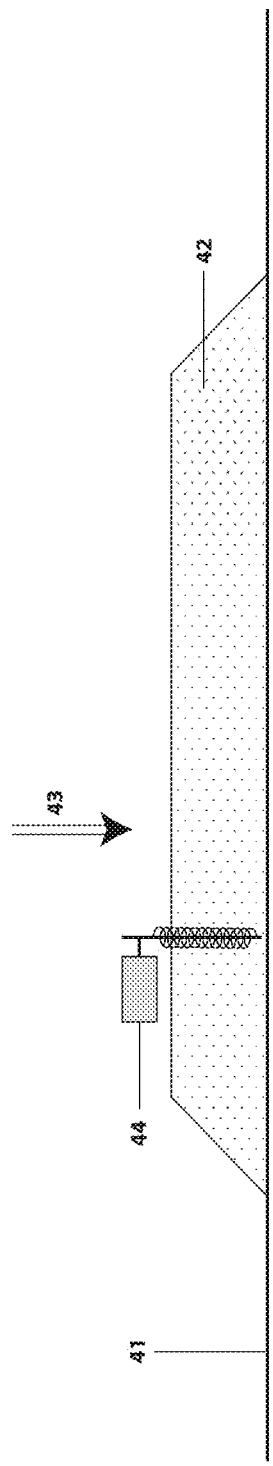
FIG. 4 is a schematic cross-sectional view of a soil pile to which an organic fuel is applied and admixed.

Further embodiments are possible where the impoundment is above-ground in a matrix pile or mound. FIG. 4 illustrates such an embodiment where a porous matrix pile (42) rests on the surface of the earth or fabricated structure (41) into which an organic fuel is applied. A mixing tool (44) may be utilized to circulate the organic fuel (43) and create the admixture. The matrix pile may either be freestanding or may be supported within or by additional structures. For example, walls may be used to encase the pile.

An example of a porous matrix pile (42) may be a pile of material excavated from the subsurface. The organic fuel may be applied or admixed with the porous matrix pile by pouring the organic fuel onto the surface of the matrix pile through a pressurized or gravity-fed pipe, chute, or emitter, and allowing it to percolate into the porous matrix pile under gravity or forced pressure, tilled into the porous matrix pile via tillers or hoes, mixed via backhoe, excavator or soil mixing/drilling rigs.

Figure 5:
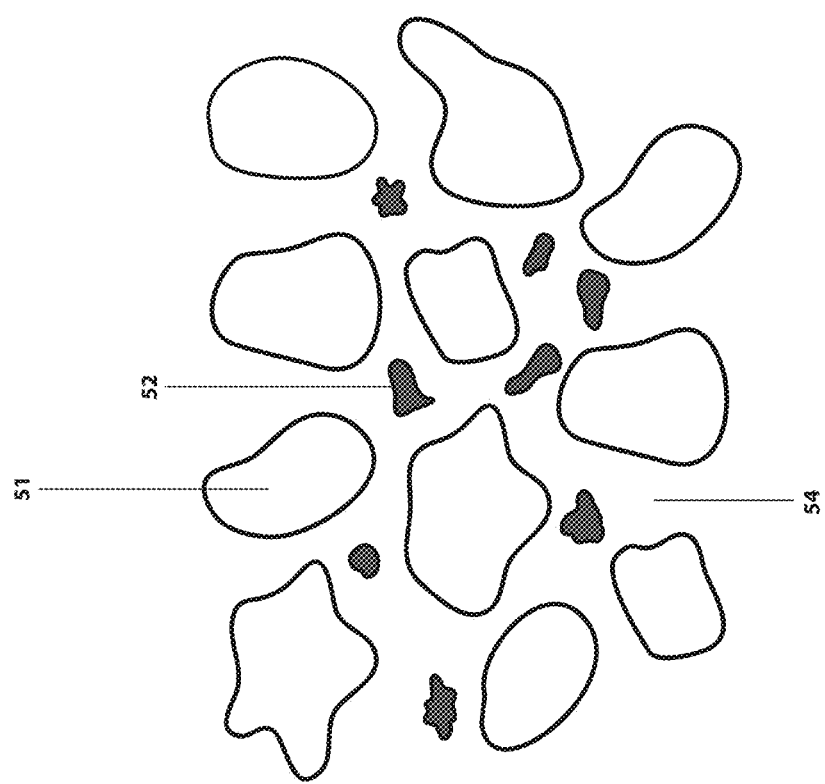
FIG. 5 is an enlarged schematic view of a mixture of an organic fuel and contaminated porous matrix material according to embodiments of the invention.

FIG. 5 illustrates an organic fuel/contaminated porous matrix mixture including solid particles (51), continuous or discontinuous chunks, pieces, blobs or ganglia of organic fuel (52) within the pore spaces (54) of the porous matrix. Embedding the combustible material in a porous matrix allows the energy released by the exothermic combustion reaction to remain in the system such that the reaction becomes self-sustaining, while facilitating the destruction, degradation, and/or removal of contaminants.

Further embodiments are possible where the organic fuel (52) is also part of the solid particle (51) and may not be added to the pore spaces (54) of the porous matrix.

Although the principle of heat recirculation is readily understood, its practical application requires balancing many variables to ensure efficiency, control combustion intensity (i.e., maintain smoldering), and control the requisite temperature for treatment. Particular attributes of the porous matrix that may require optimization include porous matrix particle size, pore size, and permeability. Particular attributes of the organic material that require optimization include state, chemical composition, concentration, viscosity, density, volatility, and wettability. Particular attributes of the combustion system that require optimization include pre-heating intensity, pre-heating duration, initial oxidant flow rate, maintained oxidant flow rate, air pressure, and oxidant content.

Figure 6:
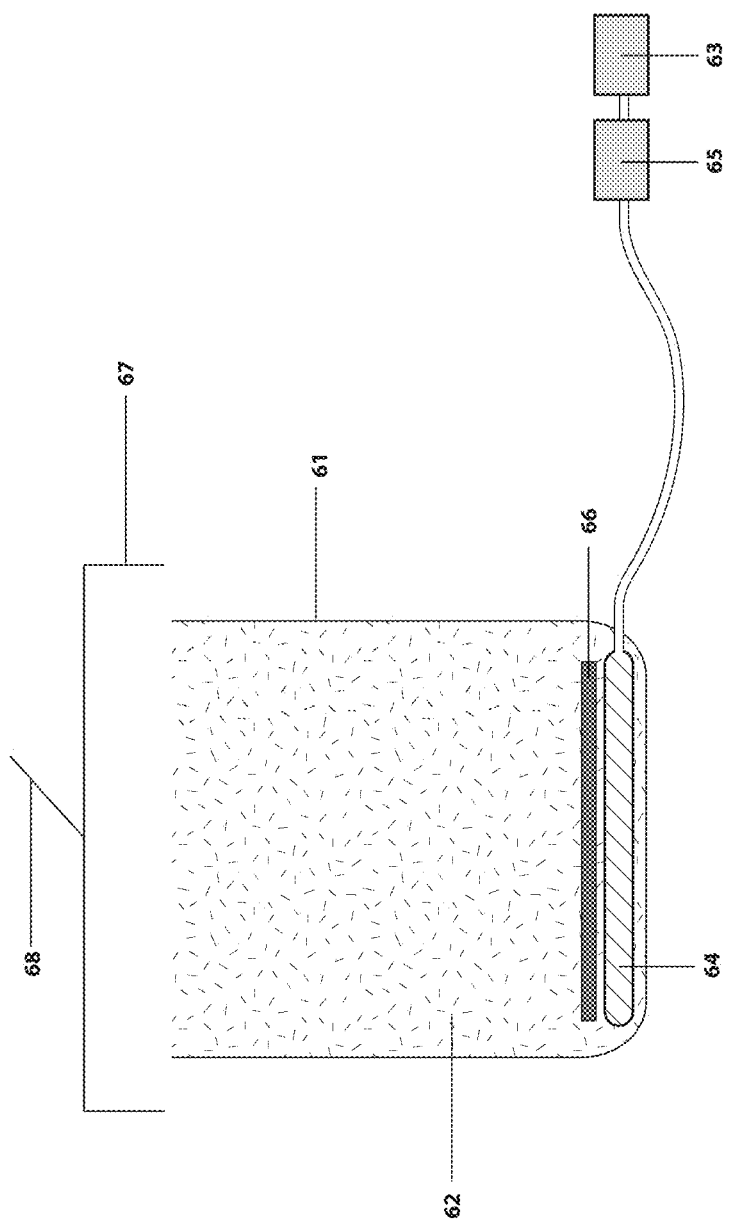
FIG. 6 is a schematic cross-section of a combustion reaction vessel comprising an oxidant source, an air supply port and heating elements.

Ignition of smoldering combustion requires both a heating source to initiate combustion and a source of oxidant to initiate and maintain combustion. FIG. 6 illustrates a combustion reaction vessel (61) containing a smolderable mixture of organic fuel and contaminated porous matrix material (62). Oxidant is supplied to the reaction vessel from an oxidant source (63) through an air supply port (64). The air supply port (64) may comprise a single aperture into the reaction vessel or may comprise a manifold with multiple apertures placed within the reaction vessel. Two different heating sources are depicted, which may be used either alone or in combination. For example, a heating source (65) may be placed in-line with the supplied oxidant to supply convective heat to the admixture. Convective heating sources may also be positioned within the reaction vessel or within the interior of the reaction vessel. Additionally, an internal heating source (66) may be placed within the reaction vessel to supply conductive or radiative heat for ignition and maintenance of smoldering. As shown in FIG. 6, the internal conductive/radiative heating source may be placed towards the bottom of the reaction vessel to propagate a "bottom-to-top" combustion front. However, the heating source may alternatively be placed towards the top of the reaction vessel to propagate a "top-to-bottom" combustion front. Additional conductive heat sources may be place throughout the interior and/or along the walls of the reaction vessel to initiate combustion at varying levels within the admixture. Vapors, including volatilized contaminants, gaseous products of the combustion reaction, and gaseous products of thermal degradation can be collected at the outlet of the reaction vessel (61) with a vapor collection system (67) and routed by a routing system (68) for use or subsequent processing.

The oxidant source may be an air compressor, blower, or passive source connected to the reaction vessel through piping or tubing with regulated or unregulated pressure or flow. The air supply port may be a series or singular section of perforated pipe, a port, or an open cavity (plenum) to distribute oxidant in the desired pattern across the surface of the admixture. The heating element may be an electrically-powered cable heater, electrically-powered cartridge heater, electro-magnetically activated heating system, or radiative tube heater in which propane or other external fuel source is internally supplied and combusted.

The air supply ports may be perforated plates, screens, perforated carbon-steel, stainless-steel or other material rods, carbon-steel, stainless-steel or other material wells with wire-wrapped or slotted screens installed within the vessel. The heating elements may be electrical resistive heaters or radiative heaters installed or placed within or adjacent to the air supply ports, installed in or adjacent to the mixture surrounding the supply ports, or an element that heats air passing through the supply ports and into the mixture.

In particular embodiments, the oxidant is oxygen supplied as a component of atmospheric air. The reaction is controllable such that terminating the supply of oxygen to the reaction front terminates the reaction. Increasing or decreasing the rate of oxygen flux to the reaction front will also increase or decrease the rate of combustion and, therefore, the propagation rate of the reaction front and the temperature of the reaction, respectively.

It should be appreciated that combustion can be monitored according to methods known to those of skill in art to determine the amounts of oxygen, air or other oxidant required to maintain smoldering combustion and control the remediation process. Combustion temperatures are commonly monitored with thermocouples which can be placed throughout the volume of material being combusted.

Combustion gases, thermal degradation products, volatilized contaminant and other vaporous compounds generated by the process are collected at the outlet of the reaction vessel or at the surface of the admixture of organic and porous matrix material.

As illustrated in FIGS. 7A and 7B, embodiments of the present invention may utilize impoundments with multiple air supply ports and heating elements. FIG. 7A depicts an embodiment wherein the impoundment is a depression containing a smolderable mixture of organic fuel and contaminated porous matrix material (711). Oxidant may be supplied to the depression from an oxidant source (712) that is coupled to air supply ports (713). The air supply ports may be boreholes drilled into a sufficiently solid mixture. Alternatively, the air supply port may be perforated hollow shafts inserted into either solid or relatively liquid mixtures. The air supply ports may be spaced according to the overall dimensions of the depression so that oxidant is delivered in sufficient quantity and at a sufficient rate throughout the depression; thereby facilitating smoldering combustion throughout the depression. Similarly, a single or a plurality of convective heating element(s) (714) may be placed in-line with the supplied air to initiate smoldering combustion at multiple points within the depression. Additionally or alternatively, multiple conductive, convective or radiative heating elements (715) may be positioned within the boreholes or shafts or within backfilled materials so that they are internal to the waste depression. Vapors, volatilized contaminants and products of the combustion reaction can be collected at the surface of the depression containing an admixture of organic fuel and contaminated porous matrix material (711) with a vapor collection system (716) and routed by a routing system (717) for use or subsequent processing.

FIG. 7B is an embodiment wherein the impoundment is a pile of contaminated porous matrix material (721). As above, both multiple air supply ports and heating elements may be used. For example, oxidant may be supplied to the pile from an oxidant source (722) that is coupled to air supply ports (723). The air supply ports may be boreholes drilled into a sufficiently solid mixture or perforated hollow shafts inserted into either solid or relatively liquid mixtures. The air supply ports may be spaced according to the overall dimensions of the pile so that oxidant is delivered in sufficient quantity and at a sufficient rate throughout; thereby facilitating smoldering combustion throughout the pile or the portion of the pile desired for treatment. Similarly, a single or a plurality of convective heating element(s) (724) may be placed in-line with the supplied air to initiate smoldering combustion at multiple points within the matrix pile. Additionally or alternatively, multiple conductive, convective or radiative heating elements (725) may be positioned within the boreholes or shafts or within backfilled materials so that they are internal to the matrix pile. Vapors, volatilized contaminants and products of the combustion reaction can be collected at the surface of the matrix pile containing a smolderable mixture of organic fuel and contaminated porous matrix material (721) with a vapor collection system (726) and routed by a routing system (727) for use or subsequent processing.

FIG. 8 illustrates additional embodiments of impoundments with air supply ports and heating elements. In FIG. 8A, a depression is shown containing a smolderable mixture of organic fuel and contaminated porous matrix material (811). Oxidant is supplied to the depression from an oxidant source (812) through an air supply port(s) (813) within or beneath the depression. The air supply ports may comprise multiple entry points into the depression or, as depicted, a manifold-type installation placed towards the bottom of the depression. Heating element(s) (814) may be placed in-line with the supplied oxidant or within or beneath the depression. As above, the particular position of the heating element(s) and air supply ports may be optimized to facilitate smoldering combustion as needed for a given mixture. Vapors, volatilized contaminants and products of the combustion reaction can be collected at the surface of the depression containing a smolderable mixture of organic fuel and contaminated porous matrix material (811) with a vapor collection system (816) and routed via a routing system (817) for use or subsequent processing.

FIG. 8B is a corresponding embodiment wherein the impoundment is a matrix pile of organic fuel and contaminated porous matrix material. In FIG. 8B, a matrix pile is shown containing a smolderable mixture of organic fuel and contaminated porous matrix material (821). Oxidant is supplied to the pile from an oxidant source (822) through an air supply port (823) within or beneath the pile. As described for the depression embodiments, several configurations of air supply ports are possible, including multiple inlets and single manifold-type structures. Heating element(s) (824) may be placed in-line with the supplied oxidant to provide convective heat. Additionally or alternatively, a conductive, convective or radiative heating source (825) may be placed within or beneath the pile. Smaller, individual conductive, convective or radiative heating sources may also be placed at multiple locations within the pile. Vapors, volatilized contaminants and products of the combustion reaction can be collected at the surface of the matrix pile containing a smolderable mixture of organic fuel and contaminated porous matrix material (821) with a vapor collection system (826) and routed via a routing system (827) for use or subsequent processing.

The air supply ports may be perforated direct-push carbon-steel, stainless-steel or other material rods, carbon-steel, stainless-steel or other material wells with wire-wrapped or slotted screens installed horizontally through the matrix pile or depression. Air supply ports may also be perforations in the engineered structure supporting the mixture. The heating elements may be electrical resistive heaters or radiative heaters installed or placed within or adjacent to the air supply ports, installed in the matrix pile surrounding the air supply ports, or an above-ground element heating air passing through the air supply ports and into the matrix pile.

Embodiments of the present invention may be designed such that a combustion front propagates through a reaction vessel, depression or matrix pile. The combustion front may be directed through heating and air flow spatial manipulations to proceed upwards, downwards, or laterally in any direction.

FIG. 9 illustrates the progress (91) of the combustion front (92) through a smolderable mixture of organic fuel and contaminated porous matrix material (93). In these embodiments, propagation of the combustion front proceeds along the direction of air flow (94). As the combustion front proceeds through the contaminated porous matrix, organic fuel within the combustion front is combusted and organic fuel in advance of the combustion front is heated. In this particular embodiment, combustion of the organic fuel proceeds essentially to completion, leaving behind an area of remediated porous matrix material (95) where the organic fuel has undergone a volumetric reduction as a result of smoldering combustion. Vapors, volatilized contaminants and products of the combustion reaction are driven to the collection system (96) at the outlet of the vessel or surface of the depression or pile and routed via a routing system (97) for use or subsequent processing.

Additional embodiments may convey the organic fuel/contaminated porous matrix relative to the combustion front. FIG. 10 illustrates a reaction vessel (101) according to such an embodiment where a first conveyor or auger device (102) is used to convey a continuous or semi-continuous supply of a smolderable mixture of organic fuel and contaminated porous matrix material (103) to a pseudo-stationary smoldering combustion reaction front (104). The smolderable mixture supply is maintained through use of the conveyor system (102) transporting a pre-mixed smolderable mixture of organic fuel and contaminated porous matrix material (103) to the reaction vessel. The smoldering combustion reaction front is maintained through the addition of oxidant (105). A mixing or conveyor tool (106) may be utilized to propagate the mixture through the reaction vessel. Although a helical mixing tool is depicted, alternatively shaped tools (e.g., corkscrews, paddles) or gravity may be used. The mixing tool may also serve to circulate oxidant through the smolderable mixture. At the combustion front, the organic fuel in the mixture is essentially consumed as a result of smoldering combustion. The resultant organic fuel-depleted porous matrix (107) is withdrawn from the reaction vessel in a continuous or semi-continuous manner and transported along a second conveyor system (108) as a porous matrix (109). Vapors, volatilized contaminants and gaseous products of the combustion and thermal degradation are driven to the collection system (110) at the outlet of the vessel or surface of the depression or pile and routed via a routing system (111) for use or subsequent processing.

Figure 11:
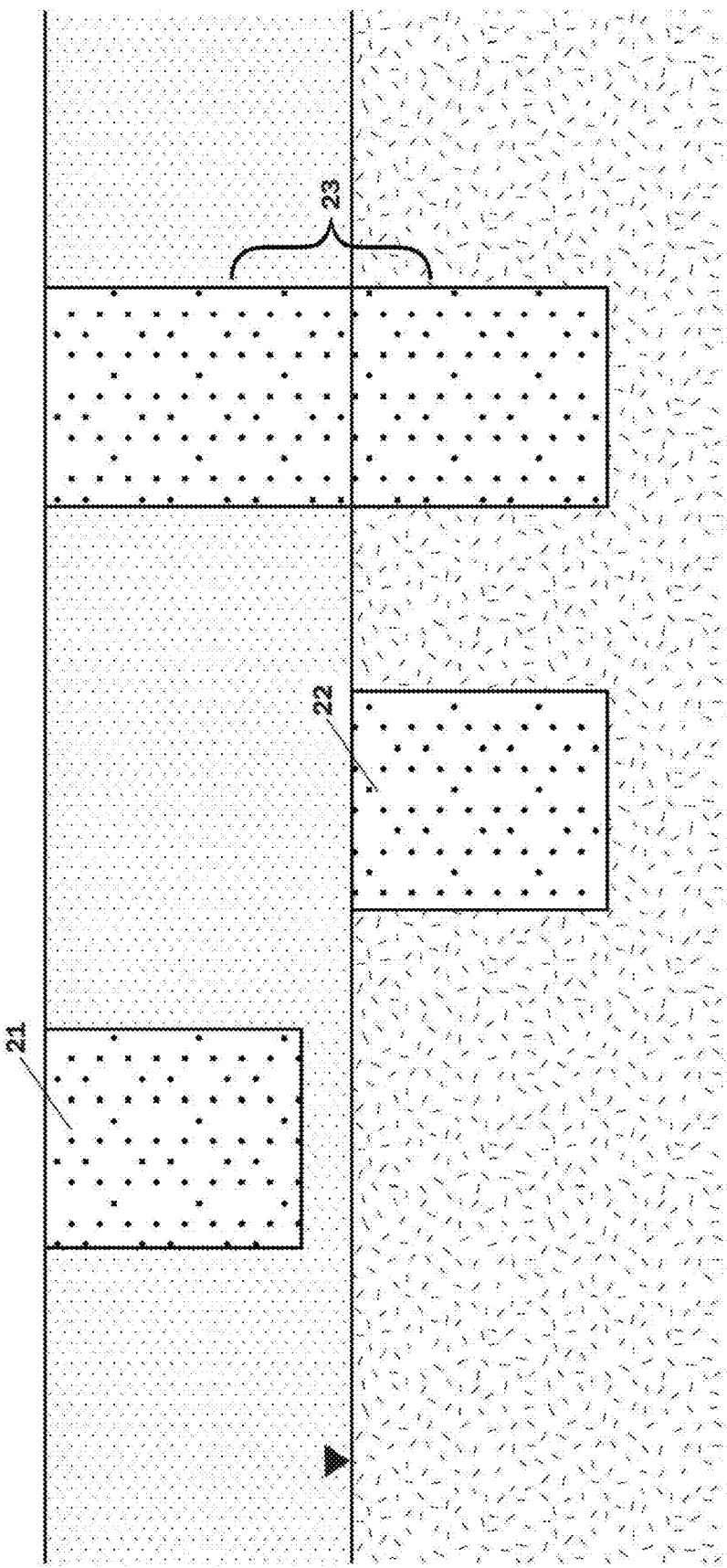
FIG. 11 is a schematic cross-sectional view of a subsurface volume of organic fuel and contaminated porous matrix material.

FIG. 11 illustrates that the organic fuel can be admixed with a subsurface volume of contaminated porous matrix in the vadose zone (21), below the water table (22) or from the surface into the water table (23).

Figure 12:
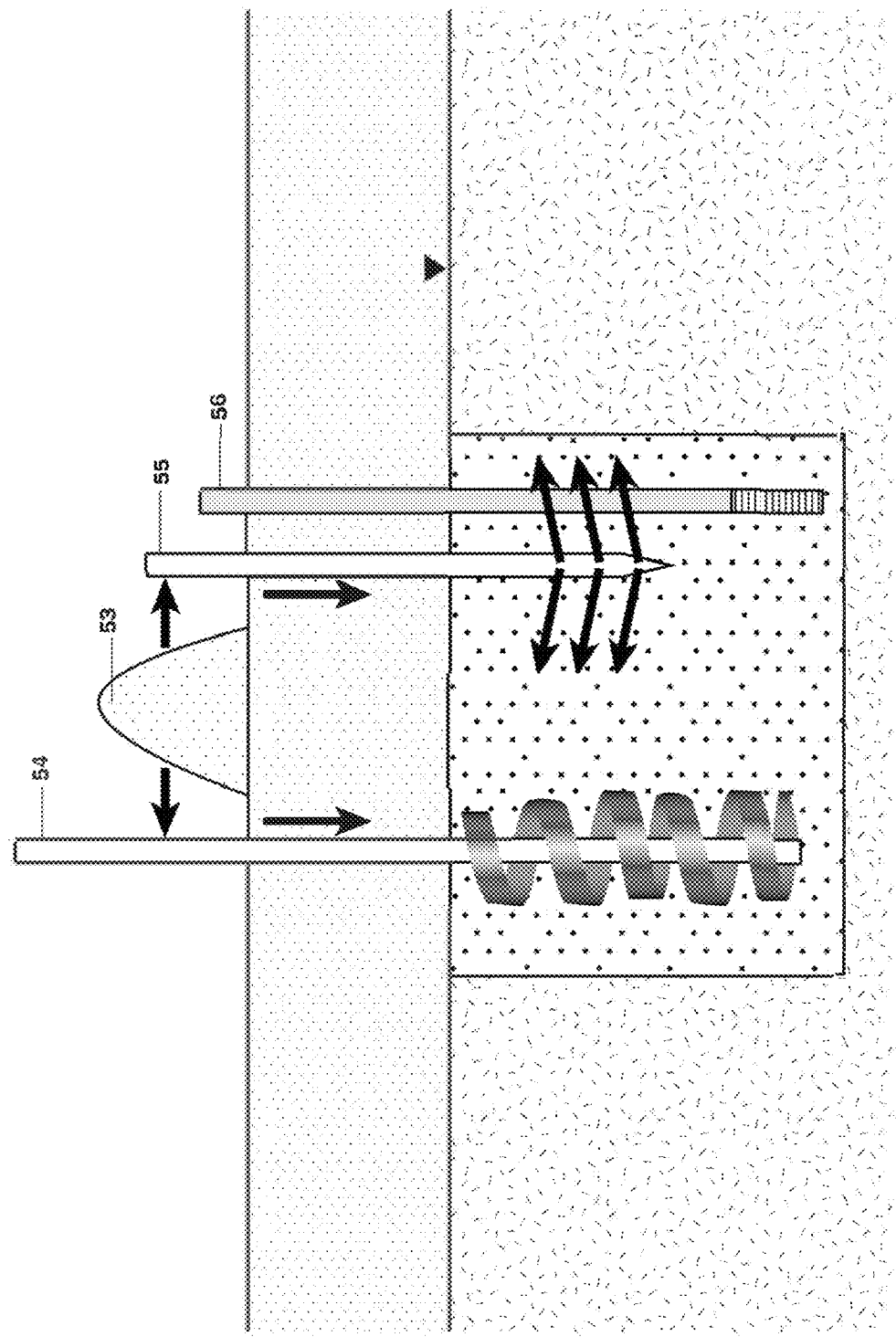
FIG. 12 is a schematic cross-sectional view of a soil mixing technique being used to admix organic fuel and contaminated porous matrix material.

FIG. 12 illustrates the use of soil mixing (54), jetting methods (55), or injection methods (56) to admix organic fuel with a subsurface volume of contaminated porous matrix material (53).

Figure 13:
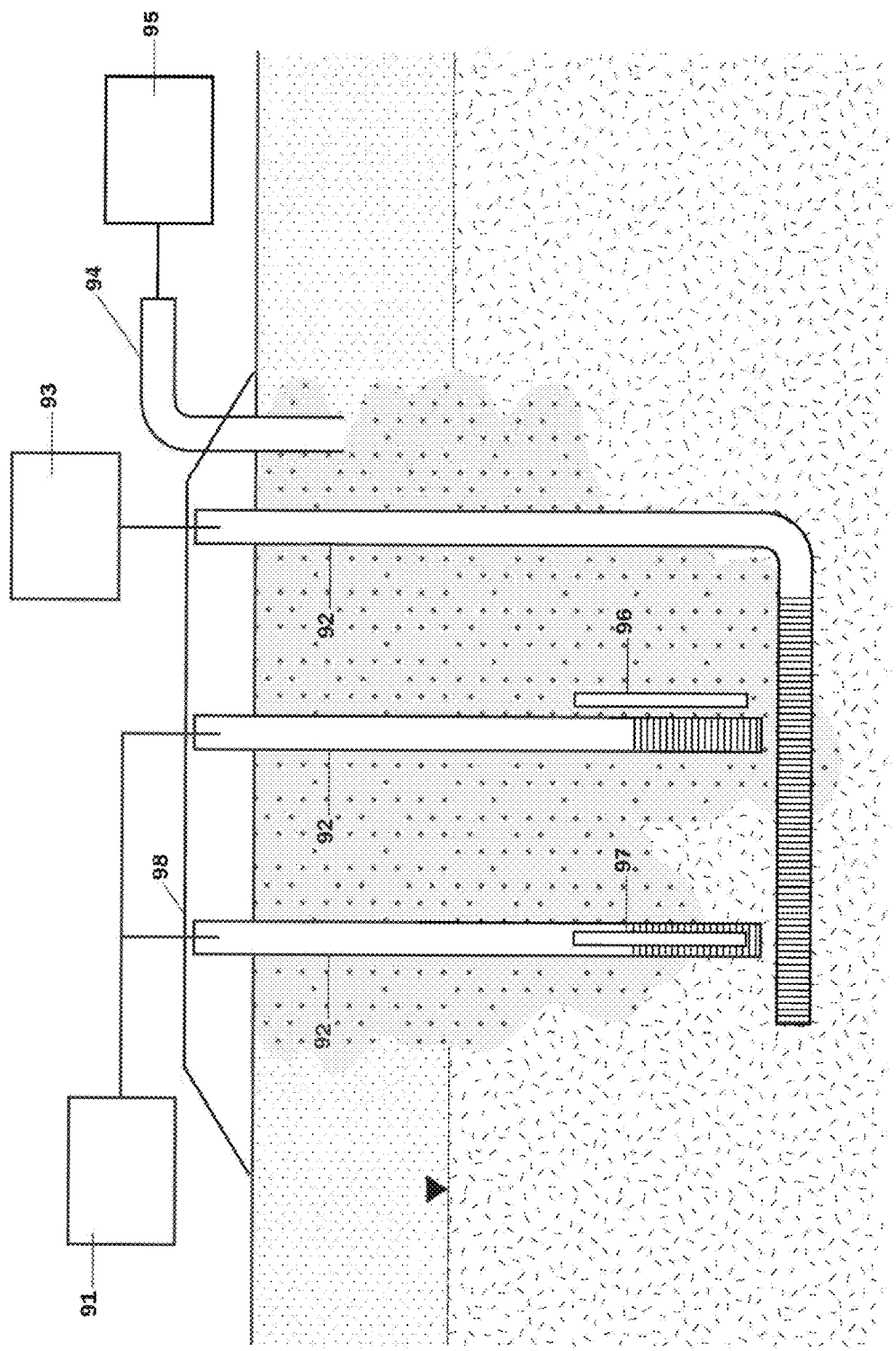
FIG. 13 is a cross-sectional schematic of a contaminated volume of soil containing organic fuel and contaminated porous matrix material undergoing treatment by smoldering combustion comprising an oxidant source and heating elements.

FIG. 13 illustrates the application of smoldering combustion to treat a subsurface volume of contaminated soil, admixed with organic fuel material. Oxidant is supplied to the subsurface smolderable mixture from an oxidant source (91) through an injection points that may be vertical or horizontal (92) located within the subsurface volume of contaminated soil. The air injection points may comprise a single aperture into the soil or may have multiple points placed within the soil. Various heating sources (e.g., conductive, convective, inductive, or radiative) may be used either alone or in combination for ignition of smoldering combustion. For example, a heating source (93) may be placed in-line with the supplied oxidant to supply heat to the suitable mixture. Heating sources may also be positioned within the volume of soil containing contaminants (96). Additionally, an internal heating source may be placed within the air supply port (97). The heating element may be an electrically-powered cable heater, electrically-powered cartridge heater, electro-magnetically activated heating system, or radiative tube heater in which propane or other external fuel source is internally supplied and combusted. Vapors, volatilized contaminants and products of the combustion reaction can be collected with a vapor collection system that collects vapors below ground (94) or above ground (98) and routed for treatment (95) or released to the atmosphere.

Figure 14:
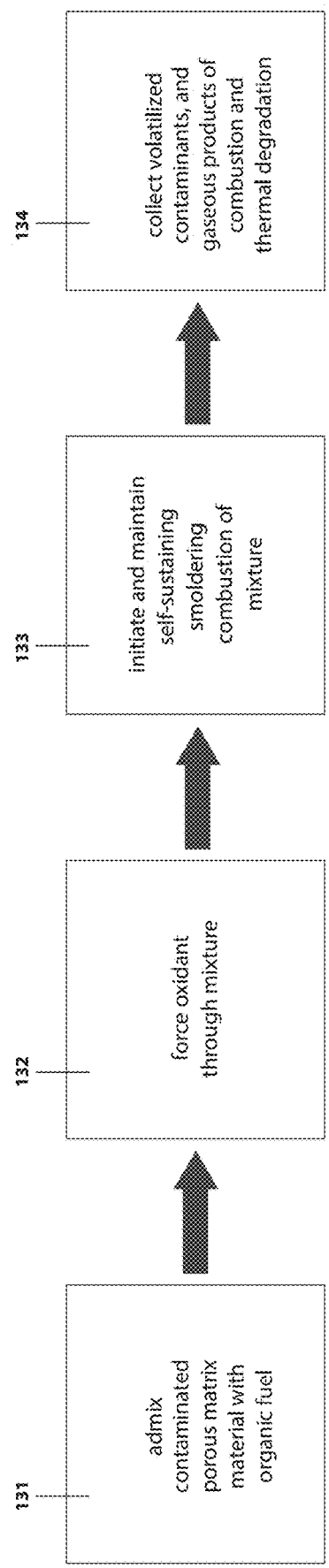
FIG. 14 is a flow diagram illustrating particular steps according to the embodiments of the invention.

FIG. 14 summarizes common features of multiple embodiments. Namely, the type and quantity of organic fuel is selected (141), the organic fuel is admixed with contaminated porous matrix material (142), oxidant is forced through the mixture (143), self-sustaining smoldering is initiated and maintained (144), oxidant addition is selected to control the rate of combustion of the organic fuel (145), to oxidatively destroy, thermally degrade, and/or remove the contaminants from the porous matrix where the relative proportion of each is governed by the type and quantity of organic fuel selected and the rate of oxidant addition.

The air supply points may be perforated plates, screens, perforated carbon-steel, stainless-steel or other material rods, carbon-steel, stainless-steel or other material wells with wire-wrapped or slotted screens installed within the vessel. The heating elements may be electrical resistive heaters or radiative heaters installed or placed within or adjacent to the air supply ports, installed in or adjacent to the mixture surrounding the supply ports, or an element heating air passing through the supply ports and into the mixture.

In particular embodiments, the oxidant is oxygen supplied as a component of atmospheric air. The reaction is controllable such that terminating the supply of oxygen to the reaction front terminates the reaction. Increasing or decreasing the rate of oxygen flux to the reaction front will also increase or decrease the rate of combustion and, therefore, the propagation rate of the reaction front and temperature, respectively. Also, the air supply can be enriched with additional oxygen to increase the oxygen content of the air supplied.

It should be appreciated that combustion can be monitored according to methods known to those of skill in art to determine the amounts of oxygen, air or other oxidant required to control smoldering combustion. Combustion temperatures are commonly monitored with thermocouples which can be placed throughout the volume of material being combusted.

Combustion gases, volatilized contaminants and other compounds produced by the process can be collected for subsequent treatment.

The air supply points may be spaced according to the overall dimensions of the volume of soil containing the contaminants so that oxidant is delivered in sufficient quantity and at a sufficient rate throughout the volume of soil containing the contaminants; thereby facilitating smoldering combustion throughout the volume of soil containing contaminants.

EXAMPLE

Removal/Destruction of PFAS from Soil
1. Material Preparation

A 15 L of stock solution of a PFAS mixture was created in a 20 L polypropylene carboy (Life Technologies) by adding 0.4445 g PFOA (CAS #335-67-1, purity=95%, ThermoFisher Scientific), 0.0117 g PFOS, 0.0291 g PFHxS (CAS #3871-99-6, purity=98%, Sigma-Aldrich), 0.0525 g PFHpA (CAS #375-85-9, purity=99%, Sigma-Aldrich), 0.0362 g PFBS (CAS #375-73-5, purity=97%, Sigma-Aldrich), and 0.0202 g 58. The carboy was shaken regularly over a 48-hour period to allow the PFAS to dissolve.

Dried, sieved topsoil (Fisher's Landscaping, London, Ontario) was then added to the carboy was agitated regularly over a 96-hour period. After the PFAS in solution adsorbed to the soil, silicone tubing (Part #96410-25, Mastedlex) and a peristaltic pump (Model 520S, Watson Marlow) were used to pump the carboy contents into the laboratory vacuum filtration system. The spiked topsoil remained in the vacuum system until all free water was removed. Once drained, the PFAS-contaminated topsoil was stored in a polypropylene container.

To imitate a field soil with a controlled grain size distribution ($\sigma$=1.16, poorly sorted soil) and organic fraction (1%), the spiked soil (28% dry wt %) was mixed with a medium (47%) and course sand (25%)

The desired amounts of GAC (CAS #7440-44-0, McMaster Carr) and the imitated field soil were placed in a stainless-steel bowl and mechanically mixed (Model KSM7581CA0, KitchenAid) until uniform. Once prepared, the porous media mixture was carefully placed in the column used for the smoldering experiments in short lifts and gently tamped to maximize homogeneity).

A contaminated porous media mixture was packed to a known height (21 to 28 cm) in a stainless-steel reactor of 16 cm inner diameter. Thermocouples (TCs) (KQIN-18U-6, Omega Ltd.) that were placed at 3.5 cm intervals measured the temperatures at the centerline of the column. Clean coarse sand (12ST, mean grain diameter=0.88 mm, Bell & Mackenzie Co.) was packed on top of the porous media mixture ($\approx$12 cm) and the column was insulated with 5 cm thick mineral wool pipe insulation (McMaster-Carr) to minimize the heat losses.

The emissions from the column were continuously analyzed for volume fractions of oxygen, carbon monoxide, and carbon dioxide using a multi-gas analyzer (MGA-3000 Series, ADC). TC and gas emissions data were recorded in two-second intervals using a data logger (Multifunction Switch/Measure Unit 34980A, Agilent Technologies) which was connected to a computer. Three emissions trains were implemented simultaneously to supply cumulative (integrated) samples for targeted and non-targeted PFAS and hydrogen fluoride (HF).

2. Smoldering

A well-established procedure was followed for smoldering treatment of contaminated soil (Pironi et al., 2011; Switzer et al., 2009; Yermán et al., 2015). The heater at the base of the reactor was turned on until the first TC (TC1) above the heater reached 260° C., at which time a set air flux was introduced through the air diffuser at the base using a mass flow controller (FMA5541, Omega Ltd.). This started a smoldering reaction, which then propagated upwards. When the reaction reached TC2, the heater was turned off. However, the airflow remained on for the duration of the experiment, such that the self-sustained smoldering reaction travelled upwards until no fuel (i.e., GAC) remained and the reactor cooled to ambient temperature. The average smoldering velocity and average peak temperature for each experiment were calculated using standard procedures (Pironi et al., 2011).

3. Analysis
   3.1. Sample Collection/Analysis

Following each experiment containing PFAS, the reactor was excavated carefully to provide representative "post-treatment" samples. The clean sand cap was first removed and samples of the clean sand cap were collected. A 250 mL sample was then collected from the center of the treatment zone. Triplicates of pre- and post-treatment samples were analyzed and averaged for each experiment. Targeted PFAS analysis was completed following EPA 8327 using liquid chromatography with tandem mass spectrometry (LC-MS/MS).

A hydrogen fluoride (HF) collection system was used to measure the fraction of PFAS mineralization that occurred. In the series of four impingers (Part #7544-35, Ace Glass Inc.), the first and fourth were used as a knock-out and the second and third contained 15 mL of 0.1 N sulfuric acid ($H_2SO_4$) (modified EPA Method 26).

4. Results

Figure 15:
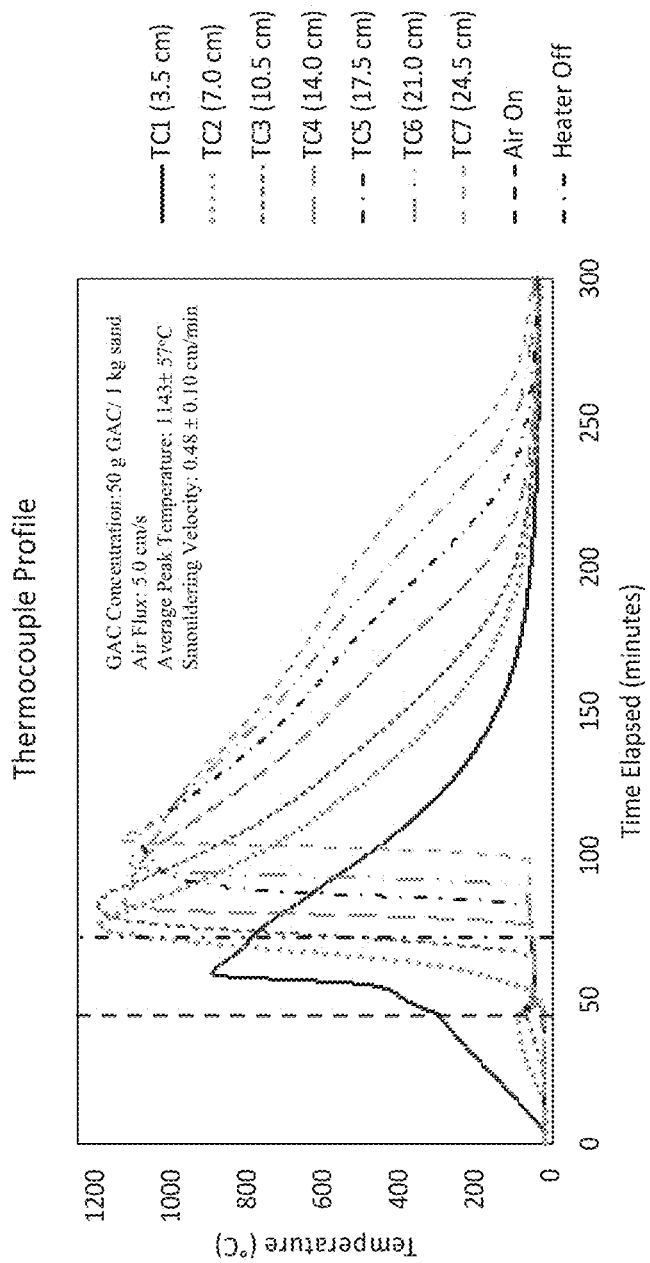
FIG. 15 presents thermocouple profiles of desorption tests.
Figure 16:
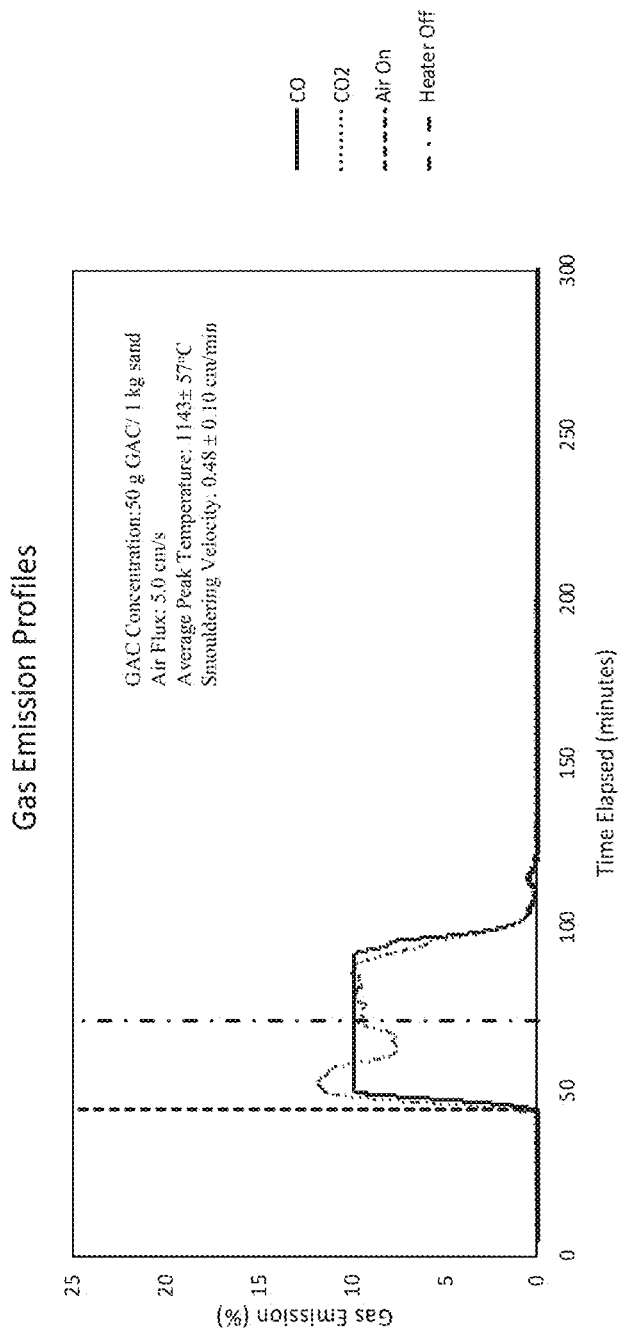
FIG. 16 presents gas emission profiles of desorption tests.
Figure 17:
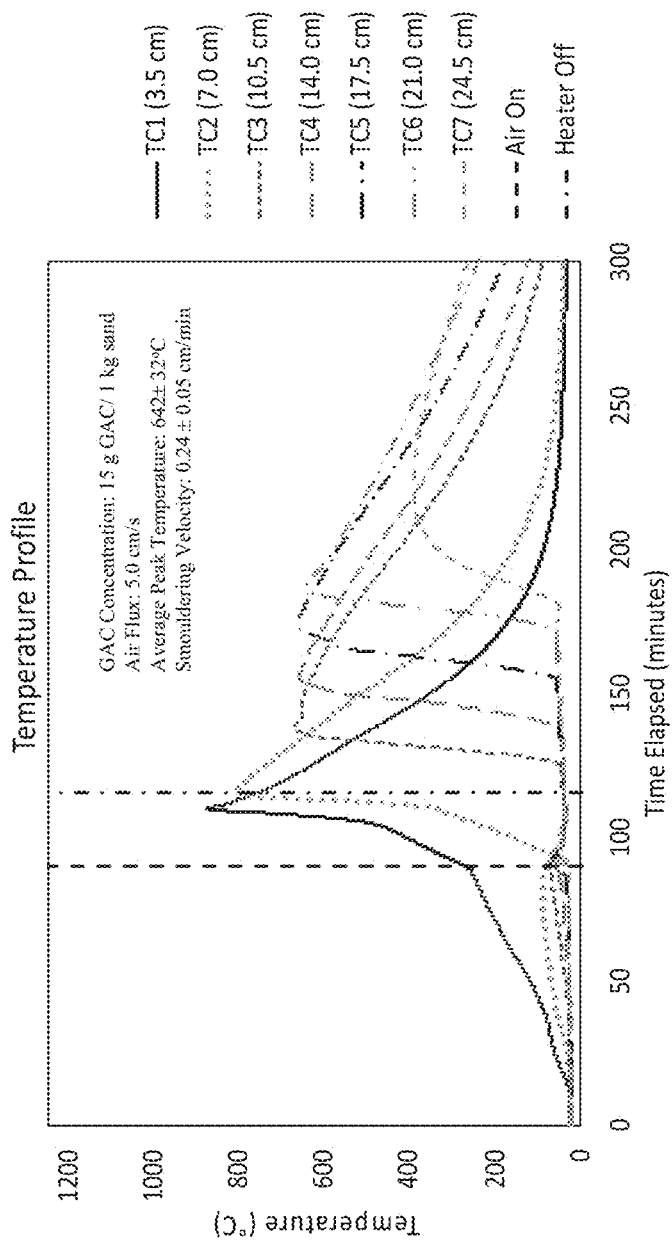
FIG. 17 presents thermocouple profiles of destruction tests.
Figure 18:
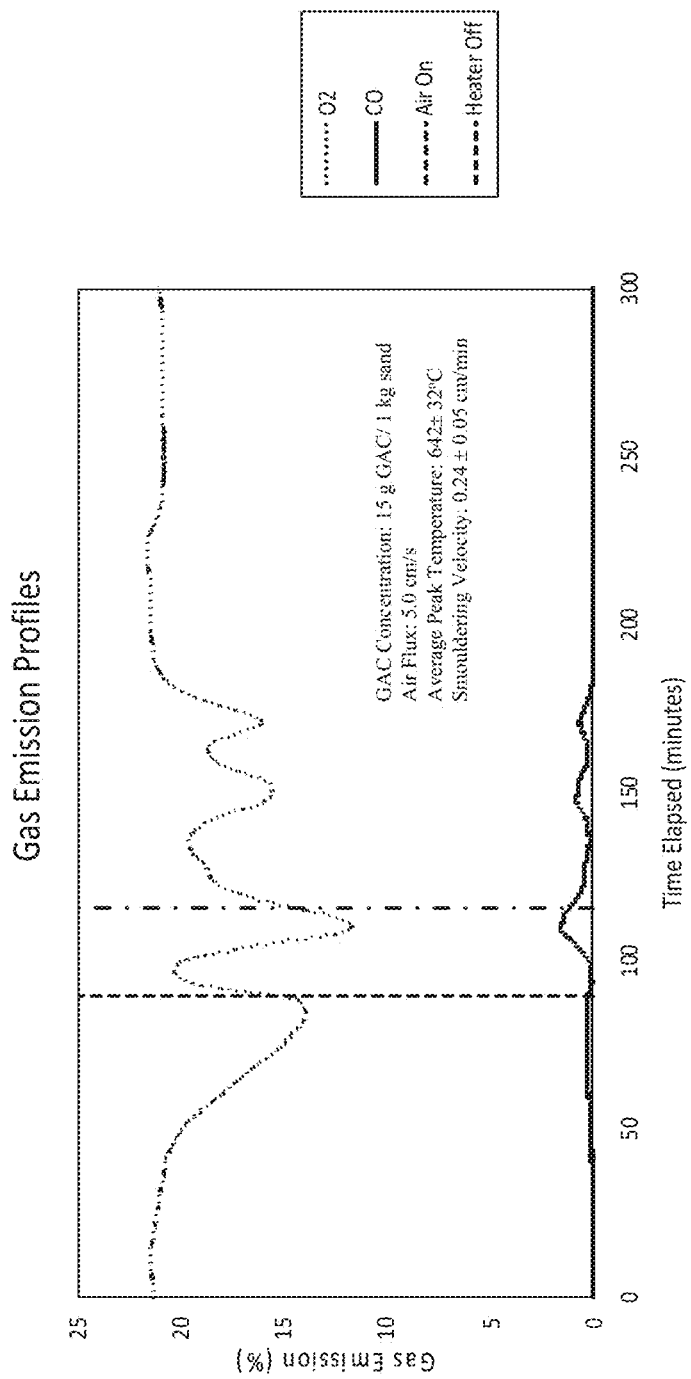
FIG. 18 presents gas emissions profiles of destruction tests.

Two GAC concentrations were used, 15 g per kg of soil (Desorption Test) and 50 g per kg of soil (Destruction Test). For both tests, the air flux was controlled at 5.0 cm/s. For the Desorption Test, FIG. 15 presents the thermocouple profile and FIG. 16 presents the gas emission profile. FIGS. 17 and 18 show the corresponding results for the Destruction Test. Each combustion test demonstrated strong self-sustaining smoldering behavior; that is, temperatures at each location within the experimental apparatus continued to increase and "cross-over" temperatures at the preceding monitoring interval following the termination of the heating element. However, the average peak temperatures differed significantly. The Desorption Test reached an average peak temperature of 642+/−32° C., whereas the Destruction Test had an average peak temperature of 1143+/−57° C. At temperatures below 700° C. PFAS would be expected to desorb and not be mineralized to HF, however, above this threshold PFAS will start to be mineralized and degraded.

Pre-treatment PFAS concentrations for the spiked soil were in the range 3-5 mg/kg. After smoldering treatment, PFAS concentrations in the soil from the column were below detection limits for both experiments representing 100% reduction in all six PFAS examined. However, based on the amount of HF released and captured, the degree of mineralization was zero (no HF detected) for the Desorption Test and 16% for the Destruction Test. These results clearly show that changing the concentration of the fuel (GAC in this case) will impact the average peak temperature that shifts the removal of PFAS from soils from a desorption to a destruction process.

The embodiments of the invention described above are intended to be merely exemplary; numerous variations and modifications will be apparent to those skilled in the art. All such variations and modifications are intended to be within the scope of the present invention as defined in any appended claims.

The invention claimed is:

1. A method for remediating a contaminated porous matrix material, the method comprising:
    selecting the type and quantity of an organic fuel;
    providing a smolderable mixture of the organic fuel and the contaminated porous matrix material;
    initiating self-sustaining smoldering combustion of the smolderable mixture;
    controlling the proportion of thermal desorption versus oxidative destruction versus non-oxidative destruction of the contaminant, so that at least a collectible portion of a contaminant is volatilized; and
    collecting the volatilized contaminant,
    wherein the proportion of thermal desorption versus oxidative destruction versus non-oxidative destruction of the contaminant is controlled by controlling the rate of oxidant addition to the smolderable mixture, and one or more of controlling the type and quantity of the organic fuel, and inclusion of a heat sink.

2. A method for remediating a contaminated porous matrix material comprising:
    selecting the type and quantity of an organic fuel;
    providing a smolderable mixture of the organic fuel and a contaminated porous matrix material;
    initiating the self-sustaining smoldering combustion of the smolderable mixture;
    controlling the proportion of thermal desorption versus oxidative destruction versus non-oxidative destruction of the contaminant, so that a portion of a contaminant is broken down into at least one collectable portion of a gaseous breakdown product, and so that at least a collectible portion of the contaminant is volatilized; and
    collecting the volatilized contaminant and the gaseous breakdown product of the contaminant,
    wherein the gaseous breakdown product is formed by one or both of oxidative destruction and non-oxidative destruction;
    wherein the proportion of thermal desorption versus oxidative destruction versus non-oxidative destruction of the contaminant is controlled by controlling the rate of oxidant addition to the smolderable mixture, and one or more of controlling the type and quantity of the organic fuel, and inclusion of a heat sink.

3. A method according to claim 1, further comprising propagating the combustion away from the point of ignition of the combustion.

4. A method according to claim 1, wherein the organic fuel is selected from the group consisting of wax, wood chips, sawdust, tire scraps, waste rubber compounds, coal, granular activated carbon, solid fat, vegetable oil, crude oil, waste oils and sludges, tar, polymers, and other organic materials that by themselves form a porous matrix or can be mixed with a porous material, and combinations thereof.

5. A method according to claim 1, wherein the smolderable mixture is created above ground.

6. A method according to claim 1, wherein the smolderable mixture is created within a subsurface volume of the contaminated porous matrix material.

7. A method according to claim 6, wherein the organic fuel is admixed below the ground using a variety of methods selected from the group consisting of trenching, large diameter auger, excavation, caisson, injection, jetting, fracking, vibrating beam, tremmie, soil mixing and combinations thereof.

8. A method according to claim 6, wherein the smolderable mixture is combusted in place.

9. A method according to claim 6, wherein the smolderable mixture is removed and combusted above the ground.

10. A method according to claim 1, wherein forcing oxidant through the smolderable mixture includes injecting air into the smolderable mixture through an injection port.

11. A method according to claim 1, wherein initiating self-sustaining smoldering combustion includes applying heat to the smolderable mixture from at least one internal conductive heating source in direct contact with the smolderable mixture.

12. A method according to claim 1, wherein initiating self-sustaining smoldering combustion includes applying heat to the smolderable mixture from at least one convective heating source coupled to the smolderable mixture.

13. A method according to claim 12, wherein at least one convective heating source is external to the smolderable mixture.

14. A method according to claim 12, wherein at least one convective heating source is located within the smolderable mixture.

15. A method according to claim 1, wherein initiating smoldering combustion includes applying radiative heat to the smolderable mixture.

16. A method according to claim 1, wherein forcing oxidant through the smolderable mixture includes injecting air into the smolderable mixture through a plurality of injection ports.

17. A method according to claim 1, wherein forcing oxidant through the smolderable mixture includes creating a vacuum to suck oxidant through the smolderable mixture.

18. A method according to claim 1 further comprising performing the smoldering combustion at a temperature within a range between 200 and 2000 degrees Celsius.

19. A method according to claim 1, further comprising forcing oxidant through the smolderable mixture at a linear velocity of between 0.0001 and 100 centimetres per second.

20. A method according to claim 1, wherein the porous matrix is contaminated with per- and polyfluoroalkyl substances, dioxins, and PCBs, metals or inorganic compounds.

21. A method according to claim 1, wherein the organic fuel is a liquid.

22. A method according to claim 1, wherein the organic fuel is a slurry.

23. A method according to claim 1, wherein the organic fuel is a solid.

24. A method according to claim 1, wherein the organic fuel is a liquid, slurry, solid, or combinations thereof.

25. A method according to claim 1 wherein the organic fuel and the contaminated porous matrix are the same.

* * * * *